UNITED STATES PATENT OFFICE.

MICHAEL JLJINSKY, OF CREFELD, GERMANY, ASSIGNOR TO R. WEDEKIND & CO., OF UERDINGEN, GERMANY.

ANTHRAFLAVIN DISULFONIC ACID AND PROCESS OF MAKING SAME.

No. 826,510.     Specification of Letters Patent.     Patented July 17, 1906.

Original application filed July 14, 1903, Serial No. 165,426. Divided and this application filed November 18, 1904. Serial No. 233,357.

*To all whom it may concern:*

Be it known that I, MICHAEL JLJINSKY, chemist, a subject of the Russian Emperor, and a resident of Südstrasse 7, Crefeld, in the German Empire, have invented a new Anthraflavin Disulfonic Acid and Production Thereof, of which the following is a specification.

In my application, Serial No. 165,426, filed July 14, 1903, I have described a process of sulfonating anthraquinon or other organic combinations, especially anthracene derivatives, in the presence of mercury, (as such or in a combined state,) by which process the sulfo group or groups enter in other positions than by the sulfonating process by means of sulfuric acid only. I have found that by this process a new anthraflavin disulfonic acid is obtained by treating anthraflavin acid with sulfuric acid in the presence of mercury, as may be illustrated by the following example: one hundred parts of anthraflavin acid, ten parts of mercury, five hundred parts of fuming sulfuric acid of forty per cent. free $SO_3$ are slowly brought up to about 120° centigrade. The entire anthraflavin acid is then transferred into a form soluble in water. The sulfonic acid obtained forms a sodium salt easily soluble in sodium lye in excess. This peculiar quality differentiates it sharply from the anthraflavin sulfonic acid formed without addition of mercury, the sodium salt of which is insoluble in an excess of sodium lye.

The new acid forms a potassium salt substantially different from the potassium salt of the known anthraflavin sulfonic salt, as may be seen from the following table:

| | Salt of known acid. | Salt of new acid. |
|---|---|---|
| Appearance | Brown powder, forming when viewed by microscope prisms pointed on both sides. | Yellow powder, forming when viewed by microscope rectangular prisms, but not pointed. |
| Solubility in water. | 0.5 gram is in thirty cubic centimeters water, even in the heat, only slightly soluble. | 0.5 gram is soluble in thirty cubic centimeters hot water with red color without residue. |
| Behavior of the watery solution with sulfate of copper. | Greenish-yellow solution, very slight intensity. | Deep red-brown solution. |

Dyeings: The behavior with copper sulfate is very characteristic and finds its explanation by the different affinity of the two sulfonic acids for oxid of copper. The new sulfonic acid forms a far more durable copper lac than the known acid. The new sulfonic acid or its salt is to be used as dyestuff or as material for producing other dyestuffs.

I claim as my invention—

1. The new anthraflavin disulfonic acid characterized by having the sulfonic groups in a new position and giving a potassium salt which forms a yellow powder of microscopical rectangular prisms not pointed and is soluble in hot water with red color and whose watery solution gives with copper sulfate a deep red-brown solution.

2. Process of producing the new anthraflavin disulfonic acid, consisting in reacting on anthraflavin acid with fuming sulfuric acid, in the presence of mercury, substantially as and for the purpose set forth.

In testimony whereof I have signed my name to this specification in the presence of two subscribing witnesses.

MICHAEL JLJINSKY.

Witnesses:
   W. BRUCE WALLACE,
   MARGARET WALLACE.